United States Patent Office 3,449,370
Patented June 10, 1969

3,449,370
PREPARATION OF 3,3-BIS(CHLOROMETHYL) OXETANE
Ernst Klesper, Bergisch Gladbach, and Hans Zoebelein, Monheim, Rhineland, Germany, assignors to Henkel & Cie., G.m.b.H., Dusseldorf, Germany, a corporation of Germany
No Drawing. Filed Oct. 18, 1966, Ser. No. 587,431
Int. Cl. C07d 3/00
U.S. Cl. 260—333        7 Claims

ABSTRACT OF THE DISCLOSURE

Process for the preparation of 3,3-bis(chloromethyl) oxetane from the easily accessible cyclic sulfurous acid ester of pentaerythritol dichlorohydrin.

PRIOR ART

Prior art attempts to form 3,3-bis(chloromethyl)oxetane by splitting off sulfur dioxide from the cyclic sulfurous acid ester of pentaerythritol dichlorohydrin resulted in a complete decomposition into sulfur dioxide, formaldehyde and dichloroisobutylene [Weissberger, Heterocyclic Compounds With Three and Four Membered Rings, part II, p. 1032 (1964)].

OBJECTS OF THE INVENTION

It is an object of the invention to provide a novel process for the preparation of 3,3-bis(chloromethyl)oxetane by splitting off sulfur dioxide from the cyclic sulfurous acid ester of pentaerythritol dichlorohydrin in the presence of a catalyst.

This and other objects and advantages of the invention will become obvious from the following detailed description.

THE INVENTION

The novel process of the invention for the preparation of 3,3-bis(chloromethyl)oxetane comprises subjecting the cyclic sulfurous acid ester of pentaerythritol dichlorohydrin to thermolysis at temperatures from 200 to 450° C., preferably 240 to 330° C., in the presence of salt-like catalysts selected from the group consisting of organic onium compounds of elements of groups Va and VIa of the periodic table and organic compounds which are converted into onium compounds to form 3,3-bis-(chloromethyl)oxetane and recovering the said compound. On the basis of the prior art, it was completely unexpected that the said process could with the aid of specific catalysts produce 3,3-bis(chloromethyl)oxetane by simply splitting sulfur dioxide off from the cyclic sulfurous acid ester of pentaerythritol dichlorohydrin.

Examples of salt-like onium compounds of elements of groups Va and VIa of the periodic table are onium compounds of phosphorus, nitrogen, arsenic and sulfur and compounds which are converted into onium compounds under the reaction conditions. The organic radicals may be alkyl, aryl, aralkyl or of heterocyclic nature.

Examples of suitable salt-like organic phosphonium compounds useful in the process of the invention are compounds of the formula

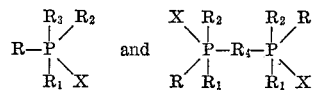

wherein R, $R_1$, $R_2$ and $R_3$ are selected from the group of alkyl of 1 to 22 carbon atoms and aryl and aralkyl radicals of 6 to 24 carbon atoms, $R_4$ is selected from the group of alkylene of 1 to 8 carbon atoms and arylene of 6 to 24 carbon atoms and X is an anion of a mineral or organic acid. Also useful are phosphines of the formula

wherein R, $R_1$ and $R_2$ have the above definitions.

Examples of specific organic phosphorous compounds are tetraphenylphosphonium chloride, tetraphenylphosphonium bromide, triphenylmethylphosphonium iodide, tetrabutylphosphonium chloride, tribenzylethylphosphonium chloride, dibenzyldiethylphosphonium chloride, benzyl-p-toluyldimethylphosphonium chloride, triphenylbenzylphosphonium chloride, 1,4 - butane-bis(triethylphosphonium acetate) and triethyloctadecylphosphonium iodide. Examples of suitable phosphine compounds which may be used are triphenylphosphine, tributylphosphine, triisopropylphosphine, dimethylphenylphosphine, diethylphenylphosphine, ethyldiphenylphosphine, diethyl-o-toluylenephosphine, di-p-toluylene chlorophosphine, and diphenylphosphine. Since the tertiary phosphorus compounds probably change into phosphonium compounds in the reaction mixture, this change is a probable explanation for their activity in the process of the invention.

Examples of suitable organic nitrogen compounds of the invention are quaternary ammonium compounds of the formula

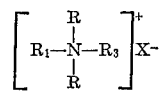

wherein R, $R_1$, $R_2$, $R_3$ and X have the above definitions and R and $R_1$ together with the nitrogen atom may form a heterocylic ring.

Examples of specific nitrogen compounds are tetramethylammonium chloride, tetramethylammonium bromide, tetramethylammonium iodide, tetrabutylammonium chloride, trimethylbenzylammonium chloride, octadecylpyridinium chloride, pyridine, 2-methylpyridine, 2-ethylpyridine, quinoline, isoquinoline and acridine.

Particularly preferred catalysts are mixtures of phosphines and small amounts, i.e., up to 2%, of pyridine bases such as triphenylphosphine and pyridine and triphenylphosphine and quinoline.

The sulfonium compounds useful in the process of the invention are compounds of the formula

wherein R, $R_1$, $R_2$ and X have the above definitions. Examples of specific sulfonium compounds are triphenylsulfonium chloride, dimethyl-n-dodecylsulfoxonium methylsulfate, trimethylsulfonium iodide, triethylsulfonium ethylsulfate, dimethyl-p-toluyl-sulfonium methylsulfate, 2-oxphenyldimethylsulfonium chloride, etc.

The arsonium compounds useful in the process are compounds of the formula

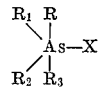

wherein R, $R_1$, $R_2$, $R_3$ and X have the above definitions. Examples of specific arsonium compounds are tetraphenylarsonium chloride, methyltriphenylarsonium iodide, triphenylbenzylarsonium chloride, etc.

The amount of the catalyst used depends on the activity of the particular catalyst, but generally about 0.2–0.002 mol-percent, preferably 0.15 to 0.01 mol-percent, based on 1 mol of the cyclic sulfurous acid ester of pentaerythritol dichlorohydrin, will suffice. The reaction temperature varies between 200° and 450° C., preferably between 240° and 330° C. At these temperatures, reaction times from about ½ hour to 8 hours, usually between 2 to 5 hours, are sufficient. To accomplish the reaction, the cyclic sulfurous acid ester of pentaerythritol dichlorohydrin is admixed with the catalyst, and the reaction mixture is heated to the said temperatures. High-boiling organic solvents may be used to dilute the reaction mixture.

Preferably, 3,3-bis(chloromethyl)oxetane, which has a lower boiling point than the cyclic sulfurous acid ester of pentaerythritol dichlorohydrin, is continuously distilled from the reaction mixture which avoids any further reaction of the said oxetane. Advantageously, the admixture of the cyclic sulfurous acid ester of pentaerythritol dichlorohydrin and the organic onium compound is added to the reaction mixture in the same proportion as 3,3-bis(chloromethyl)oxetane is distilled off which gives an exceptional continuous operation. The distillation of the said oxetane formed is preferably carried out at reduced pressure, such as between 100 torrs, and about normal atmospheric pressure, in a distillation column.

The 3,3-bis(chloromethyl)oxetane, precipitating during the thermolysis, is already present in relatively pure form and by means of simple distillation, it can be further purified and subsequently polymerized. As known in the art, 3,3-bis(chloromethyl)oxetane can be converted by means of a ring polymerization into polymers having valuable properties.

The cyclic sulfurous acid ester of pentaerythritol dichlorohydrin starting material can be prepared in known ways such as described in German Patents No. 875,805 and No. 871,449.

In the following examples there are described several preferred embodiments to illustrate the invention. However, it should be understood that the invention is not intended to be limited to the specific embodiments.

Example I

A three-neck, round-bottom flask of ½ liter capacity was equipped with a dropping funnel, a thermometer extending to the bottom of the flask and a heatable first column ½ m. long, which column was filled with 8 x 8 mm. Raschig rings. Said column was connected with a second, heatable, column of 1 m. length filled with glass spirals. A column head, equipped with an Anschütz-Thiele adaptor and a receiver flask, was connected to the said second column and a trap cooled with Dry Ice methanol was attached thereto by means of a three way stop cock, so that the liberated sulfur dioxide could be condensed. The reaction was started by first introducing dropwise a small amount of a mixture of the cyclic sulfurous acid ester of pentaerythritol dichlorohydrin and tetraphenyl phosphonium chloride into the round-bottom flask heated in a metal bath to a temperature of 270° to 280° C. The first column was heated to 250° to 270° C. and the second column to 175° C. at the bottom and 130° C. at the top. The pressure in the apparatus was approximately 300 torrs. After decomposition had started and 3,3-bis(chloromethyl)oxetane began to distill under the specific conditions, dropwise introduction of a mixture consisting of 195 gm. of the cyclic sulfurous acid ester of pentaerythritol dichlorohydrin and 20 gm. of tetraphenylphosphonium chloride was started, and the 3,3-bis(chloromethyl)oxetane formed from this moment on was collected in a clean receiver. After the dropwise introduction of the said mixture, 109 gm. of crude 3,3-bis(chloromethyl)oxetane were distilled in 1¼ hours, during which time 56 gm. of sulfur dioxide condensed in the trap. The crude product was then redistilled to obtain 72.6 gm. of 3,3-bis(chloromethyl)oxetane.

Example II

Using the apparatus of Example I, a mixture of 219 gm. of the cyclic sulfurous acid ester of pentaerythritol dichlorohydrin and 15.6 gm. of triphenyl phosphine were dropped into the above mentioned lower column instead of into the flask itself. After the mixture had been fed into the column, equilibrium conditions existed in the apparatus. The receiver was then replaced with a clean flask and a mixture of 438 gm. of the cyclic sulfurous acid ester of pentaerythritol dichlorohydrin and 31.3 gm. of triphenyl phosphine was introduced dropwise over a period of 3 hours into the said lower column. The temperature in the flask was about 300° to 330° C., 300° to 320° C. at the base of the lower column, 270° to 275° C. at the top of the lower column, about 175° C. at the bottom of the second column and 150° C. at the top of the second column and the pressure in the system was about 300 torrs. 325 gm. of crude 3,3-bis(chloromethyl)oxetane was recovered in the receiver which upon redistillation, gave 165.7 gm. of purified 3,3-bis(chloromethyl)oxetane.

Example III

Using the apparatus and procedure of Example I, equilibrium was established in the system and after a clean receiver flask was substituted, a mixture of 438 gm. of the cyclic sulfurous acid ester of pentaerythritol dichlorohydrin, 31.3 gm. of triphenyl phosphine and 6.0 gm. of pyridine was introduced dropwise into the decomposition vessel over a period of two hours. The temperature was kept at about 250 to 270° C. in the three-neck flask, 270 to 280° C. in the lower column and 158 to 168° C. for the vapors and the pressure was about 300 torrs. 312 gm. of distillate were obtained in the receiver flask which upon distillation yielded 235.7 gm. of 3,3-bis(chloromethyl) oxetane. Upon another distillation of the latter, 215 gm. of 3,3-bis(chloromethyl)oxetane were obtained.

Example IV

Using the procedure and apparatus of Example I, a mixture of 438 gm. of the cyclic sulfurous acid ester of pentaerythritol dichlorohydrin, 31.3 gm. of triphenyl phosphine and 15.5 gm. of quinoline were introduced dropwise over a period of 3 hours into the flask. The temperature was held at 250 to 270° C. in the three-necked flask, 240 to 270° C. in the lower column and 146 to 156° C. for the vapors and the pressure was about 300 torrs. 301 gm. of a crude distillate was obtained which upon redistillation yielded 215 gm. of 3,3-bis(chloromethyl)oxetane.

Various modifications of the process of the invention may be made without departing from the spirit or scope thereof and it is to be understood that the invention is to be limited only as defined in the appended claims.

We claim:
1. A process for the preparation of 3,3-bis(chloromethyl)oxetane which comprises subjecting the cyclic sulfurous acid ester of pentaerythritol dichlorohydrin to thermolysis at temperatures from 200 to 450° C. in the presence of at least one salt-like catalyst selected from the group consisting of organic onium compounds of elements selected from the group consisting of phosphorus, sulfur, nitrogen and arsenic and compounds which are converted into the said onium compounds to form 3,3-bis(chloromethyl)oxetane and recovering the latter.

2. The process of claim 1 wherein the temperature is 240 to 330° C.

3. The process of claim 1 wherein the reaction is effected at a pressure between 100 torrs and atmospheric pressure.

4. The process of claim 1 wherein the amount of catalyst is 0.2 to 0.002 mole per mole of the said sulfurous acid ester.

5. The process of claim 1 wherein the amount of catalyst is 0.15 to 0.01 mole per mole of the said sulfurous acid ester.

6. The process of claim 1 wherein the element of the periodic table is phosphorus.

7. The process of claim 1 wherein the catalyst is a mixture of an organic phosphine and a small amount of a pyridine base.

References Cited

UNITED STATES PATENTS 2,844,592   7/1958   Pietsch et al. _____ 260—333

OTHER REFERENCES

Houben-Weyl: Methoden der Organischen Chemie, vol. VI/3, 1965, pp. 493–5.

NORMA S. MILESTONE, *Primary Examiner.*